US007244907B2

(12) United States Patent
Hogan

(10) Patent No.: US 7,244,907 B2
(45) Date of Patent: Jul. 17, 2007

(54) METHOD OF OPTIMIZING OPTICAL POWER USE IN A PARALLEL PROCESSING LASER SYSTEM

(75) Inventor: Daniel Hogan, Acton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 39 days.

(21) Appl. No.: 10/881,317

(22) Filed: Jun. 30, 2004

(65) Prior Publication Data

US 2006/0000815 A1    Jan. 5, 2006

(51) Int. Cl.
*B23K 26/38* (2006.01)
*G06F 19/00* (2006.01)

(52) U.S. Cl. .......................... 219/121.71; 219/121.69; 700/166

(58) Field of Classification Search ............. 219/121.7, 219/121.71, 121.68, 121.69, 121.73; 700/166
See application file for complete search history.

(56) References Cited

U.S. PATENT DOCUMENTS

| | | | |
|---|---|---|---|
| 5,544,182 A * | 8/1996 | Nagaishi et al. ....... | 372/29.021 |
| 6,433,301 B1 | 8/2002 | Dunsky et al. | |
| 6,433,303 B1 * | 8/2002 | Liu et al. ............... | 219/121.75 |
| 6,452,132 B1 | 9/2002 | Fuse | |
| 6,534,743 B2 | 3/2003 | Swenson et al. | |
| 6,635,849 B1 * | 10/2003 | Okawa et al. ......... | 219/121.73 |
| 6,664,502 B1 * | 12/2003 | Liu ......................... | 219/121.7 |
| 6,720,519 B2 * | 4/2004 | Liu et al. ................ | 219/121.75 |
| 6,777,641 B2 * | 8/2004 | Cole et al. ................ | 219/121.7 |
| 6,804,574 B2 * | 10/2004 | Liu et al. ..................... | 700/166 |
| 6,829,517 B2 * | 12/2004 | Cheng et al. ................ | 700/166 |
| 6,884,961 B1 * | 4/2005 | Dmitriev et al. ........ | 219/121.69 |
| 6,951,627 B2 * | 10/2005 | Li et al. .................. | 219/121.71 |
| 2002/0065790 A1 * | 5/2002 | Oouchi ....................... | 705/400 |
| 2003/0103107 A1 * | 6/2003 | Cheng et al. ........... | 219/121.71 |
| 2004/0016730 A1 * | 1/2004 | Liu ........................... | 219/121.73 |
| 2006/0109874 A1 * | 5/2006 | Shiozaki et al. .......... | 219/121.6 |

FOREIGN PATENT DOCUMENTS

EP    1101561 A2 *  5/2001
JP    2000-280085 A  * 10/2000

* cited by examiner

*Primary Examiner*—Geoffrey S. Evans
(74) *Attorney, Agent, or Firm*—Harness, Dickey & Pierce, PLC

(57) ABSTRACT

The present invention relates to optimizing optical power from a laser processing system, and more specifically to a method of optimizing the optical power by employing parallel laser processing techniques to maximize fabrication quality and yield. The method in the present invention includes the steps of: determining the specification for the final product, selecting the proper combination of optical power and processing method for processing a single feature, determining the maximum number of features in pattern to be parallel processed, selecting a portion of the desired pattern that can be parallel processed, designing the DOEs, manufacturing the DOEs, incorporating the DOE into laser processing system, operating and controlling the laser processing system, and determining if more DOEs are needed to complete the laser processing.

11 Claims, 2 Drawing Sheets

METHOD OF OPTIMIZING OPTICAL POWER USE IN A PARALLEL PROCESSING LASER SYSTEM

FIELD OF THE INVENTION

The present invention relates to optimizing the use of optical power in laser processing systems, and more specifically to a method of optimizing the use of optical power in parallel processing systems to maximize fabrication quality and yield.

BACKGROUND OF THE INVENTION

There is an ever-increasing demand for smaller and smaller electronic devices in today's high-tech marketplace. As a result, new and innovative. fabrication techniques have become a focal point of many manufacturers. Many manufacturers have turned to laser processing as a means of fabrication, (e.g. for blowing fuses, via and hole drilling, ablation or material transformation patterning, or resistor trimming). However, most laser processing systems are very costly and inefficient. For example, single feature laser processing systems process one feature (i.e. pattern, hole or via) through ablative, additive, or transformational means at a time and are therefore incapable of efficiently operating in large volume manufacturing environments. Many manufacturers have sought means to reduce cost by increasing yield. However, increasing yield often requires higher optical power from the laser. Increasing optical power reduces the processing time each feature thus yield is increased, but this increase in optical power often has a negative effect of lowering the quality in the fabricated devices due to overexposure. Therefore there exists a need to reduce cost by increasing manufacturing yield without sacrificing manufacturing quality. Likewise, there exists a need to increase manufacturing quality without sacrificing manufacturing yield.

One way that manufacturers have sought to increase manufacturing yield and reduce cost is through parallel processing, where a energy beam is split in order to process more than one feature at a time. Diffractive optical elements (DOEs) are often employed in parallel laser processing systems because they are capable of providing highly efficient and highly uniform beam splitting. Unlike conventional optical components that utilize refraction and/or reflection, DOEs enable parallel processing by optically diffracting and directly controlling the optical phases of the beam. Therefore, a wide range of applications including, for example, multi-spot beam splitters or shapers, can be expected. The beam splitting or shaping can be used for drilling holes or vias of various sizes and shapes and multiple ablation or material transformation patterns.

A method of patterning holes in a surface of an object through the use of parallel processing with a DOE can be found in U.S. Pat. No. 6,635,849, entitled "Laser beam machine for micro-hole machining." The '849 patent details a process of beam splitting to increase manufacturing yield. To ensure that manufacturing quality is also met, the '849 patent details a process where masks control the optical power and the beam diameter from over-exposing the object under process. However, masks (e.g. aperture, imaging or pinhole masks allow only a small portion of the laser's beam to be used, wasting 20% to 80% of the optical power. Thus, the highest potential yield is not realized and manufacturing cost is increased. Therefore there exists a need to more economically use the optical power supplied by laser processing systems.

It is an object of the invention to reduce cost by increasing manufacturing yield without sacrificing manufacturing quality.

It is another object of this invention to increase manufacturing quality without sacrificing manufacturing yield.

It is yet another object of this invention to more economically use the optical power supplied by laser processing systems.

SUMMARY OF THE INVENTION

The present invention seeks to optimize the use of laser power to balance the two key competing aspects of laser processing: process quality and manufacturing throughput. This optimization is achieved first through making reference to the specification of the end product which specification includes parameters that define quality and cost. The first step is to find the optimum laser processing parameters for a single feature that is repeated multiple times on the desired product. Based on these parameters and the available laser power, the maximum number of features that can be processed in parallel is determined. At this point it can be ascertained if the entire process can be completed with one DOE or if the process needs to be broken down into sub-processing steps with multiple DOEs being designed and fabricated for use on each part of the end product. After the DOEs are fabricated, the laser system is controlled and operated in order to fabricate the product.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention includes a system and method for optimizing the use of optical power during parallel processing with a laser processing system.

Figure 1:
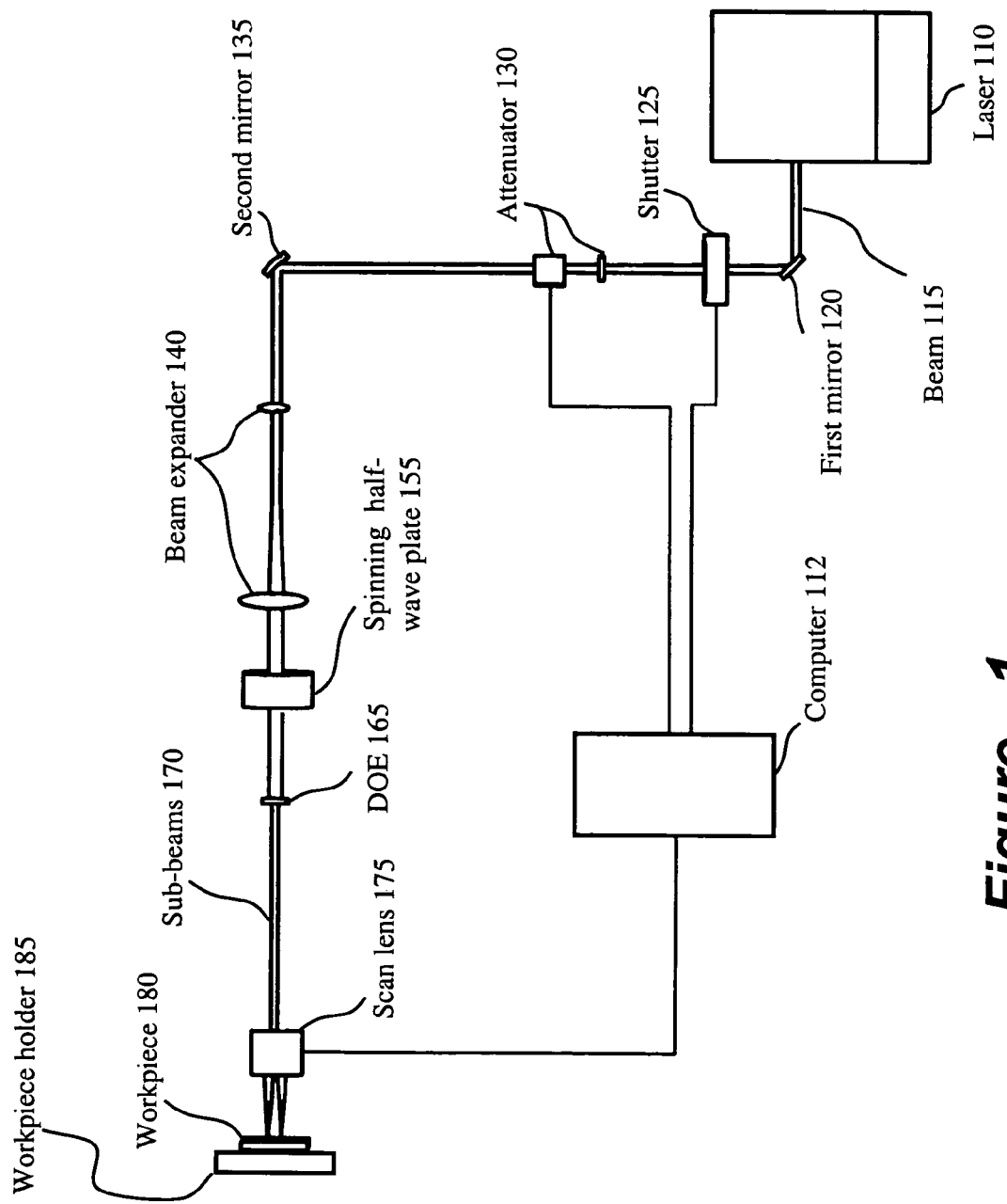
FIG. 1 illustrates a laser processing system.

FIG. 1 illustrates a laser processing system 100, including the elements of: a laser 110, a computer 112, a beam 115, a first mirror 120, a shutter 125, an attenuator 130, a second mirror 135, a beam expander 140, a spinning half-wave plate 155, a DOE 165, a plurality of sub-beams 170, a scan lens 175, a workpiece 180, and a workpiece holder 185, arranged as shown.

Laser 110 provides sufficient pulse energy or average power to ablate or transform material in workpiece 180. In one example, laser 110 is a picosecond (ps) laser (bandwidth less than 0.1 nanometer (nm)) consisting of an oscillator and a regenerative amplifier, the oscillator output power equals 35 milliwatts (mW), the pulse width is approximately 15 ps, the regenerative amplifier output power is 1 Watt (W) at 1 kilohertz (kHz) the energy per pulse is 1 millijoule (mJ), the power stability is 1.7% over 12 hours and the pointing stability is approximately 1%.

Beam 115 is emitted by laser 110.

First mirror 120 and second mirror 135 are conventional mirrors used to direct or steer beam 115 along a specified path. Please note that the actual number of mirrors used to steer beam 115 may vary, depending the specific layout of the optical path of the drilling system.

Shutter 125 is a conventional mechanical shutter, like those made by Vincent Associates (e.g., model # LS6ZMZ). The purpose of shutter 125 is to allow beam 115 to illuminate the workpiece 180 when shutter 125 is in the open state, and to prevent beam 115 from illuminating workpiece 180 when shutter 125 is in the closed state.

Computer 112 is a computing means, like a personal computer which minimally includes: conventional input devices (e.g., keyboard, mouse); output devices (e.g., monitor, printer, disk, etc); communication means (e.g., network card, serial ports); an operating system (e.g., Microsoft Windows, Linux); and software to convert product specifications into instructions for elements within laser processing system 100. As shown in FIG. 1, computer 112 has communication links to shutter 125, attenuator 130, and scan lens 170. Computer 112 is required to coordinate the movements of these elements when processing complex features (like shaped holes) in workpiece 180. In this example, computer 112 contains software applications capable of converting product, laser, and material specifications into processing algorithms required for laser processing system 100 to produce products that meet specifications. Computer 112 may be communicating only with shutter 125 in examples where laser processing system 100 is processing simple features (like straight holes) in workpiece 180. Computer 112 has access to lookup tables that contain historical data from various combinations of lasers, workpiece materials, and processing methods.

Attenuator 130 is a filter that continuously controls the energy outside laser 110. Attenuator 130, as shown in FIG. 1, includes a half-wave plate, such as those manufactured by CVI Laser (e.g., model # QWPO-1053-06-2-R10), followed by a polarizer, such as one manufactured by CVI (e.g., model # CPAS-10.0-670-1064).

Beam expander 140 is used in the present invention to match the spot size of beam 115 to the pupil size of scan lens 175. The specifications of beam expander 140 are selected in coordination with the specifications of beam size of laser 110 and scan lens 175. The laser beam size from beam expander 140 should be the same size or slightly smaller than the pupil size of scan lens 175. One example of a beam expander is made of a pair of negative and positive lenses, with a focal length of −24.9 millimeters (mm) for the negative lens, and 143.2 mm for the positive lens.

Spinning half-wave plate 155 changes the polarization of beam 115 to increase the smoothness of the features in workpiece 180. In one example where laser processing system 100 is drilling tapered holes in workpiece 180, such a change in polarization decreases rippling on the walls of the hole. In one embodiment, spinning half-wave plate 155 is a half-wave plate, such as those made by CVI Laser (e.g., model # QWPO-1053-06-2-R10), spinning at 600 revolutions per minute (RPM) driven by an electric motor.

DOE 165 is a highly efficient beam shaper or beam splitter and beam array pattern generator that allows laser processing system 100 to process features in workpiece 180 either singly or in parallel. In an alternate embodiment, DOE 165 is part of a DOE changer (not shown) that contains more than one DOE and provides a fast and simple way of changing the DOE used in laser processing system 100.

The pattern of shaped beam or sub-beams 170 output by DOE 165 is pre-determined by the product specifications. In one example, the DOE splits beam 115 into 152 beams in the forms of 4 rows with 38 beams in each row. In another example, the DOE shapes the beam into a rectangle.

Scan lens 175 is preferably an f-theta (f-θ) telecentric (scan) lens. Scan lens 175 determines the spot size of shaped beam or sub-beams 170 upon workpiece 180. The size of the shaped beam or sub-beams 170 as they enter scan lens 175 must be less than or equal to the pupil size of scan lens 175. Telecentricity is required to keep the incident angle between shaped beam or sub-beams 170 and workpiece 180 perpendicular, which is necessary to parallel process features in workpiece 180. In alternate embodiments where the axes of the features do not need to be parallel to each other, a non-telecentric scan lens can be used.

Workpiece 180 is the target of laser processing system 100. In one example, workpiece 180 is a stainless steel inkjet nozzle foil; however, the present invention may be generalized to a variety of workpiece materials, such as polymers, semiconductor metals, or ceramics. In alternate embodiments, laser processing system 100 can process features of a wide variety of shapes and tapers in workpiece 180.

Workpiece holder 185 is used in a laser drilling system to support workpiece 180 during laser drilling. Workpiece holder 185 is round, but in practice, workpiece holders could be any of a variety of shapes, including triangles, squares, rectangles, pentagons, etc. Workpiece holder 185 is made of a hard, durable, stiff, and heat-resistant material (e.g., steel, aluminum, machinable ceramic, etc.). Workpiece holder 185 is generally attached to the stage in a laser drilling system with nuts and bolts or other similar attachment means. In one example, workpiece holder 185 is attached to a fixed stage. In another example, workpiece holder 185 is attached to a X-Y axis moveable stage. This stage may be moved during laser processing to create linear or circularly symmetric features. In the case of multiple sub-beams each of these features will have a fixed correspondence to each other depending on the geometry of the sub-beams generated by the DOE.

In operation, laser 110 emits beam 115 along the optical path identified in FIG. 1 above. Beam 115 propagates along the optical path, where it is incident upon first mirror 120. First mirror 120 redirects beam 115 along the optical path, where it is incident upon shutter 125. Computer 112 sends a signal to shutter 125 to open the shutter and illuminate workpiece 180. Beam 115 exits shutter 125 and propagates along the optical path to attenuator 130. Attenuator 130 filters the energy of laser 110 in order to precisely control ablation or material transformation parameters Beam 115 exits attenuator 130 and propagates along the optical path, where it is incident upon second mirror 135. Second mirror 135 redirects beam 115 along the optical path, where it is incident upon beam expander 140.

Beam expander 140 increases the size of beam 115. Beam 115 exits beam expander 140 and propagates along the optical path, where it is incident upon spinning half-wave plate 155. Spinning half-wave plate 155 changes the polarization of beam 115. Upon exiting spinning half-wave plate 155, beam 115 propagates along the optical path, where it is incident upon DOE 165.

DOE 165 splits beam 115 into a plurality of sub-beams 170, which allow parallel processing of workpiece 180. Sub-beams 170 exit DOE 165 and propagate along the optical path, where they are incident upon scan lens 175. Scan lens 175 determines the spot size of sub-beams 170 upon workpiece 180. Sub-beams 170 exit scan lens 175 and propagate along the optical path, where they are incident upon workpiece 180. Sub-beams 170 ablate or transform workpiece 180, which is held in position by workpiece holder 185. In an alternate embodiment, DOE 165 shapes beam 115 in order to create a unique feature. In a further embodiment, shaped beam can be split into multiple sub-beams by a second DOE disposed at the same location as DOE 165 or DOE 165 can be a compound DOE that both shapes and splits the beam.

Figure 2:
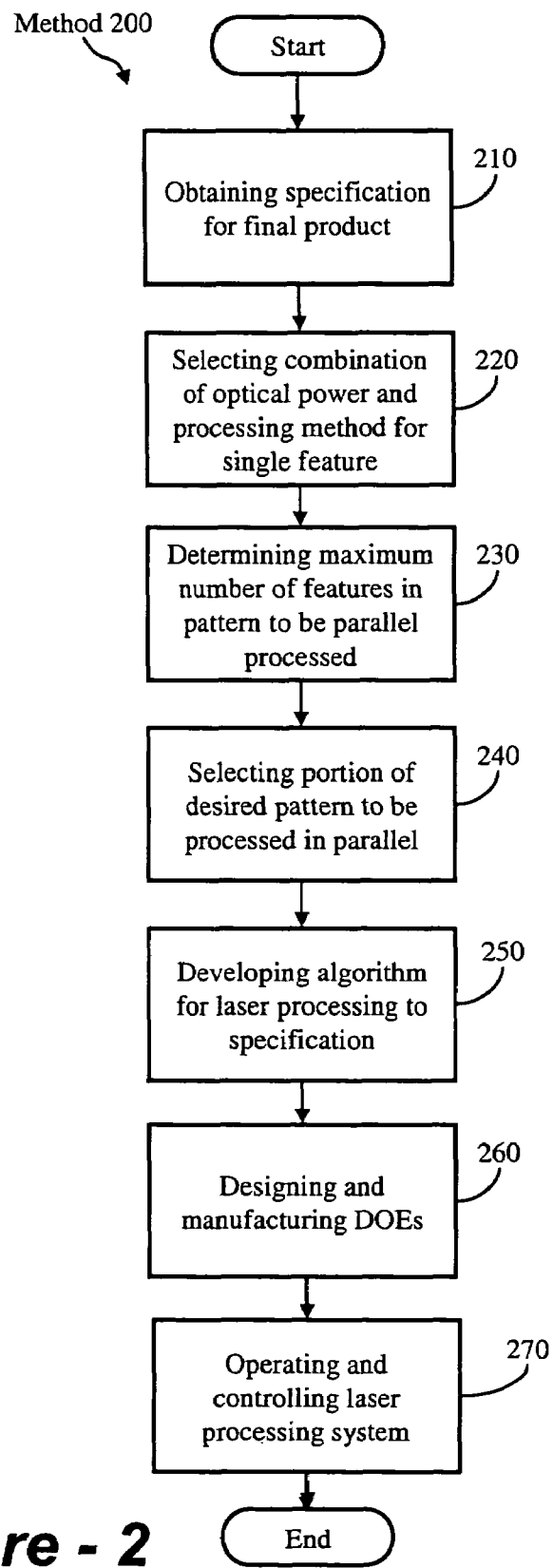
FIG. 2 illustrates a functional block diagram method of optimizing the use of optical power in parallel processing systems to maximize fabrication quality and yield.

FIG. 2 illustrates a functional block diagram method 200 method of optimizing the use of optical power in laser processing system 100 to maximize fabrication quality and yield. Technicians familiar with laser processing can readily adjust the method below to include other embodiments, such as parallel processing without shaped features.

Method 200 includes the steps of:

Step 210: Obtaining Specifications for Final Product

In this step, specifications for final product are analyzed and converted to a digital format. Specification details include feature shape and size, quality, materials, manufacturing cost, etc. This specification is available to computer 112. In one example, the specification is stored on computer 112. In another example, computer 112 accesses the specification via a communication means like a network or the Internet. In one example, the specification is stored in a computer aided design (CAD) file. In another example, the specification is stored in a database table similar to Table 1 below.

Method 200 proceeds to step 220.

Step 220: Selecting Combination of Optical Power, Processing Method, and Material for Single Feature In this step, computer 112 selects the best combination of optical power and processing method to meet product specifications from step 210 for a single feature. Examples of possible lasers include: CW, millisecond, microsecond, nanosecond, picosecond, and femtosecond. Examples of possible laser processing methods include: percussion, trepanning (flycutting), milling, zoom processing and material transformation in the absence of ablation (e.g. conversion of monomer to polymer, refractive index or transmissivity changes). Computer 112 accesses lookup tables and based on historical results stored in database (not shown) computer 112 selects the best combination of laser and processing method based on historical data that shows results of the various processing methods when used with the material that was selected in step 210. In one example, computer 112 accesses a database (not shown) with product specification and results data for the available lasers and processing methods.

TABLE 2

Sample of laser characteristics data accessed by computer 112

| Laser_name | Wavelength | Pulse Energy | Pulse_width | Spot_size | Repetition Rate |
|---|---|---|---|---|---|
| Picosecond1 | 1053 nm | 1 mJ | 20 ps | 10 μm | 1 kHz |
| CW | 248 nm | n/a | n/a | 10 μm | continuous |
| Picosecond2 | 1064 nm | 10 mJ | 40 ps | 10 μm | 2 kHz |
| ... | ... | ... | ... | ... | |

TABLE 1

Sample of specification data

| Material_name | Feature shape? | Absorption? | Melt Temp? | Size? | # of Features? | Pattern of features? |
|---|---|---|---|---|---|---|
| SteelFoil1 | Cone | 1.88 × 10$^5$ cm$^{-1}$ | 1535° C. | 20 μm | 500 | Regular |
| AlFoil2 | Polygon1 | 1.21 × 10$^6$ cm$^{-1}$ | 660° C. | 40 μm | 200 | Linear |
| PolymerFilm1 | Cylinder | 2.08 × 10$^6$ cm$^{-1}$ | 110° C. | 80 μm | 2000 | Random |
| ... | | ... | ... | | | |

TABLE 3

Illustrative laser processing data accessed by computer 112

| Laser Processing | Hole Shape | Ablation rate? | Ablation Threshold | Material? |
|---|---|---|---|---|
| Flycutting-Algorithm-F1 | Straight | 1 mm$^2$ × 1 μm/1 mJ pulse | 1 J/cm$^2$ | W |
| Zoom Processing - Algorithm-ZP1 | Cone | 1 mm$^2$ × 1 μm/0.1 mJ pulse | 0.2 J/cm$^2$ | Al |
| Percussion | tapered | 1 mm$^2$ × 1 μm/0.5 mJ pulse | 0.5 J/cm$^2$ | Fe |
| ... | | | | |

Method 200 proceeds to step 230.

Step 230: Determining the Maximum Number of Features in Pattern to be Parallel Processed In this step, the available optical power is divided by the optimum required optical power for a single feature as defined above. Laser 110 has a pre-defined amount of optical power. This amount of optical power is divided by the optimum amount of optical power for a single feature defined in step 220 and combined with a coefficient that estimates loss of optical power from DOE 165 to determine how many features can be processed in parallel.

Method 200 proceeds to step 240.

Step 240: Selecting Portion of Desired Pattern that can be Parallel Processed In this step, computer 112 (or operator) selects the portion of the pattern to be processed. In one example where the product specification pattern contains 100 features, and 50 features have been identified in step 230 as the maximum number of features to be parallel processed, a portion of 50 features (representing ½ of all features of the final product) would be selected in this step. Method 200 proceeds to step 250.

Step 250: Developing Algorithm for Laser Processing to Specification

In this step, an algorithm is developed that combines the characteristics of the laser, laser processing method, and materials to meet the product specification. This algorithm will be used by computer 112 to direct how sub-beams 170 ablate workpiece 180. The algorithm is used by computer 112 to control shutter 125, attenuator 130, and scan lens 175 and produce the desired shape in workpiece 180. Method 200 proceeds to step 260.

Step 260: Designing and Manufacturing DOEs

In this step, DOE 165 is designed split beam 115 into sub-beams 170. DOE 165 is designed to split beam 115 into a number of sub-beams equal to the number of features to be parallel processed, as determined in step 240. In the example mentioned in step 240, where the number of features is 100 and 50 features is the maximum number of features to be parallel processed, two DOEs are likely be needed. Any number of DOEs may be designed to accommodate the number of features desired from step 240. After DOE 165 is designed it can be manufactured to match specifications. In one example, an optics vendor, like MEMS Optical (Huntsville Ala.) manufactures DOE 165. Method 200 proceeds to step 270.

Step 270: Operating and Controlling Laser Processing System

In this step, workpiece 180 is in place, computer 112 sends a signal to open shutter 125 and laser processing begins. Scan lens 175 is adjusted by computer 112 to process workpiece 180 according to the combination of optical power, processing method, and materials selected in step 220. In one example where the laser processing method selected is "zoom processing," computer 112 adjusts the radius of the annulus and dwell time of sub-beams 170 to meet specifications defined in step 210. In one example where laser processing system 100 is using zoom processing to drill shaped holes, dwell time correlates to the amount of material abated from workpiece 180. Computer 112 also adjusts attenuator 130 to adjust the optical power of beam 115. All adjustments by computer 112 are done according to algorithm defined in step 250. If more than one DOE 165 is needed to complete the product specified, DOE 165 is replaced with another DOE that has a different sub-beam pattern, creating another set of features on workpiece 180.

Because information is available to build the required database lookup tables, and to compare and select the best system and operating parameters for DOE-supported laser processing in a given situation, manufacturing quality and manufacturing yield are maximized while optimally and economically using the optical power supplied by a laser processing system through efficient parallel processing.

After step 270, product manufacturing is complete and method 200 ends.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A laser processing method, comprising:

obtaining specifications for a final product, including: (a) analyzing the specifications and converting the specifications to a digital format, wherein specification details include feature shape and size, quality, materials, and manufacturing cost; and (b) making the digital format of the specifications available to a computer, including storing the specifications in a data structure specifying name of workpiece material, feature shape, material absorption characteristics, material melt temperature, feature size, number of features, and pattern of features;

selecting a combination of optical power, processing method, and workpiece material for a single feature to meet the product specifications;

determining, based on available optical power of the combination and an optimum required optical power for the single feature, a maximum number of the single features in a desired pattern of the product specifications to be parallel processed;

selecting a portion of the pattern that can be parallel processed based on the maximum number of features, wherein the portion specifies a number of the single features less than all of the single features of the desired pattern;

developing an algorithm for laser processing to specification, including combining characteristics of a selected laser, laser processing method, and workpiece material to meet the product specifications; and operating and controlling a laser processing system according to the algorithm, including adjusting a scan lens to process a workpiece according to the combination of optical power, processing method, and workpiece material, wherein operating and controlling the laser processing system includes:

(a) using a first diffractive optical element having a first sub-beam pattern to create a first set of features on a workpiece;

(b) replacing the first diffractive optical element with a second diffractive optical element having a second sub-beam pattern; and (c) using the second diffractive optical element to create a second set of features on the workpiece.

2. The method of claim 1, wherein making the digital format of the specifications available to the computer includes storing the specifications on the computer.

3. The method of claim 1, wherein making the digital format of the specifications available to the computer includes storing the specifications in memory accessible to the computer via a communications network.

4. The method of claim 1, wherein making the digital format of the specifications available to the computer includes storing the specifications in a computer aided design file.

5. The method of claim 1, wherein selecting the combination of optical power, processing method, and workpiece material includes selecting the optical power from a set of lasers including excimer, picosecond, and femtosecond lasers.

6. The method of claim 1, wherein selecting the combination of optical power, processing method, and workpiece material includes selecting the processing method from a set of processing methods including percussion, trepanning (flycutting), milling, material transformation and zoom processing.

7. The method of claim 1, wherein selecting the combination of optical power, processing method, and workpiece material includes selecting the combination of optical power and processing method based on historical data recording results of previous use of various combinations of optical power and processing methods when used with material specified by the product specifications.

8. The method of claim 1, wherein determining the maximum number of features includes dividing available optical power by an optimum required optical power for the single feature.

9. The method of claim 8, wherein determining the maximum number of features includes combining the optical power with a coefficient that estimates loss of optical power from a diffractive optical element.

10. The method of claim 1, wherein operating and controlling the laser processing system includes adjusting a radius of an annulus and dwell time of sub-beams to meet the specifications.

11. The method of claim 1, wherein operating and controlling the laser processing system includes adjusting an attenuator to vary optical power of a laser beam.

* * * * *